May 24, 1955   E. N. BACON   2,708,773
METHOD FOR MAKING MOLDS
Filed Aug. 6, 1951   4 Sheets-Sheet 1

Inventor
Ernest N. Bacon
by Roberts, Cushman & Grover
Att'ys

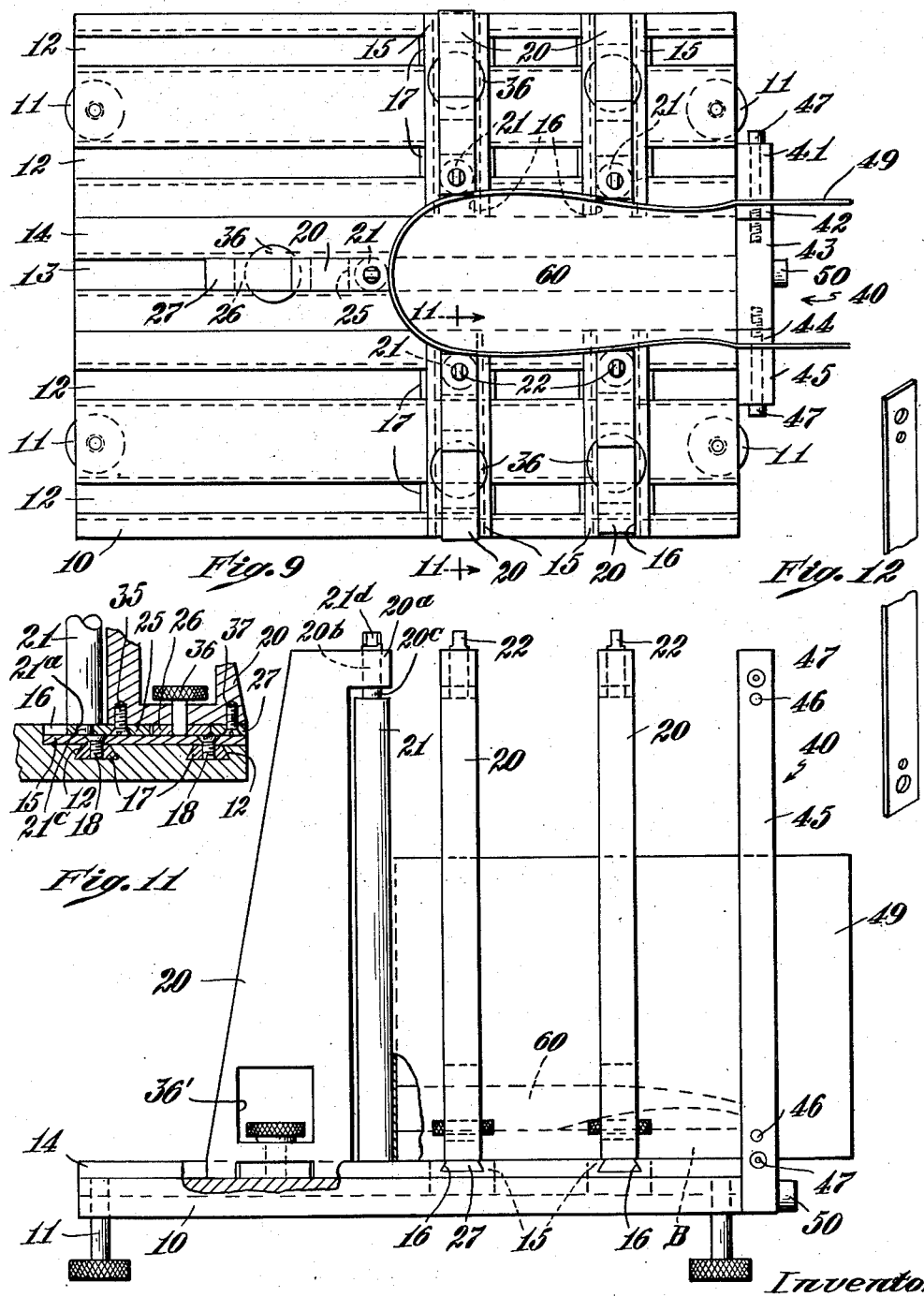

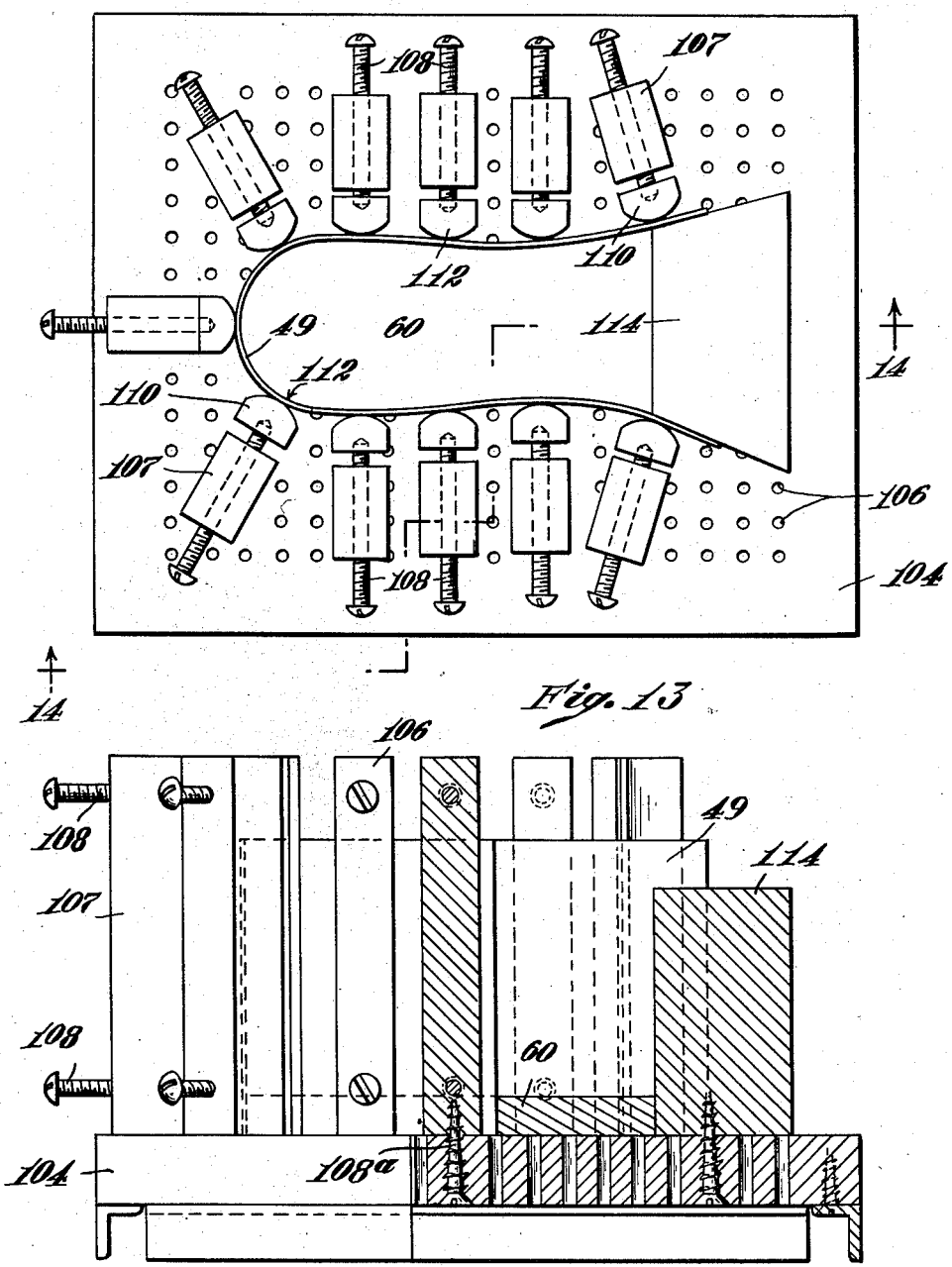

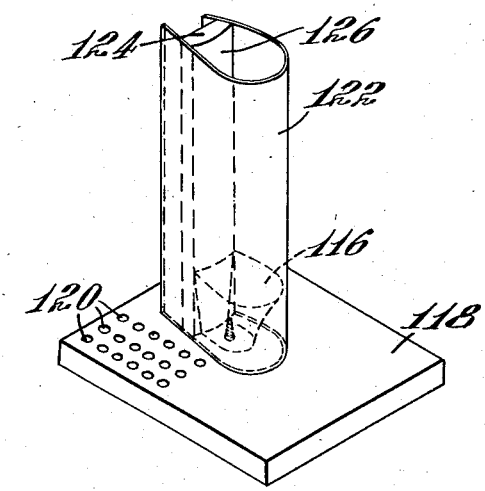
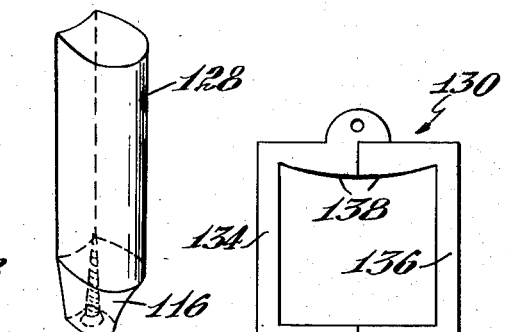
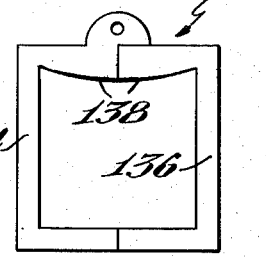
Fig. 15    Fig. 16    Fig. 17
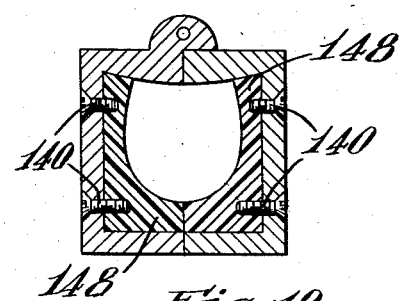
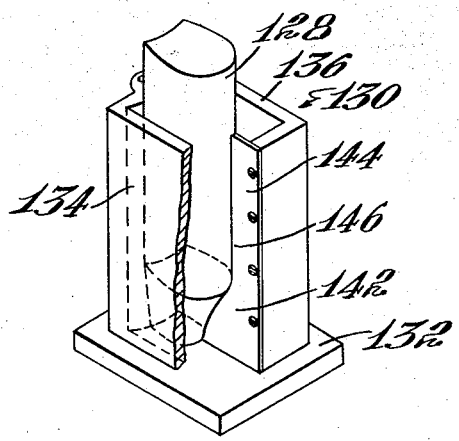
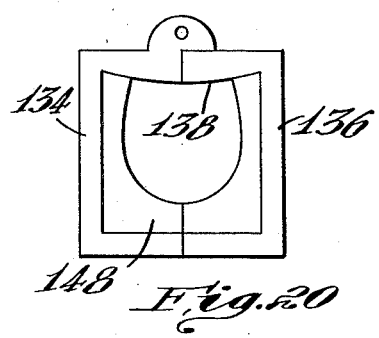
Fig. 19    Fig. 18    Fig. 20
Inventor
Ernest N. Bacon
by Roberts, Cushman & Grover
Att'ys.

United States Patent Office 2,708,773
Patented May 24, 1955

2,708,773

METHOD FOR MAKING MOLDS

Ernest N. Bacon, Plympton, Nova Scotia, Canada, assignor of one-half to Herman W. Richter, Bridgewater, and one-half to Harold R. Gillette, Wellesley Hills, Mass.

Application August 6, 1951, Serial No. 240,502

6 Claims. (Cl. 18—58)

This invention relates to a method for making mold parts and more especially to a mold for making articles of irregular shape such as heels of the "Wedgie" and "Dutchy" type commonly used in the manufacture of California type shoes.

The type of heel referred to tapers from top to bottom and the principal objects of the invention are to provide an easy method of making a mold and inserts therefor of such shape that an uncompacted preform of fibers such as described in the pending application of Richter and Gillette Serial No. 239,092, filed July 28, 1951, may be placed therein and pressed to final shape. A further object of the invention is to provide a simple apparatus for making the mold and inserts therefor. Still further objects are to provide an apparatus which can be used in making molding equipment for articles other than heels and/or heels of various size and shape.

As herein illustrated, the mold is made by supporting a pattern of the article to be made on one surface, that is its top or bottom erecting, a wall substantially perpendicular to the supporting member about the perimeter of the article so as to have a cross-section corresponding to a perpendicular projection of the upper surface of the article and then filling the walled receptacle formed by the wall and the top of the article with a hardenable fluid material to form a block having a cross-section corresponding to a perpendicular projection of the top of the article and an end face corresponding to the upper surface of the article. A second block is made in the same manner so as to have a cross-section corresponding to a perpendicular projection of the opposite face of the article and an end face corresponding to the contour of the opposite face of the article. The blocks made as thus described, form the inserts of the mold and they are now combined with an article, that is the pattern of the article is sandwiched between the inserts and then a fluid plastic is cast about the composite and allowed to solidify whereupon the inserts and article are removed leaving a mold block having an internal cavity open at its top and bottom. The cavity thus formed will have an internal intermediate portion conforming to the periphery of the article to be made and a depth equal in thickness to the article in its various parts. At opposite sides of the intermediate section the cavity will be of uniform bore to the open top and bottom ends, one part corresponding to a perpendicular section of one side of the article and the other to a perpendicular section of the opposite side of the article and the inserts will be slidable within the cavity to and from the intermediate section.

The apparatus for making the mold has a rigid base of suitable dimensions to serve as a support for the article to be made with one side up, a flexible wall adapted to be wrapped about the periphery of the article and means on the base which may be brought into engagement with the wall to cause it to conform closely to the pattern. The wall may be a flexible sheet of metal and the means for holding it in conformity to the pattern are adjustable transversely and longitudinally of the base so as to bear against the wall at a sufficient number of spaced points to obtain true conformity. To this end the base may have longitudinally thereof spaced grooves within which are arranged blocks for sliding movement on the base and the blocks in turn may have mounted on them perpendicular to the base stays which may be adjusted transversely of the grooves so as to bring them close to the wall. Preferably there are supplementary wall engaging elements in the form of slats carried by the stays which may be brought to bear on the walls and which are adjustable so as to impart just the right contour for every part of the wall. In lieu of grooves in the base, the base may have a plurality of perforations therein and the stays may be erected perpendicular to the base and made fast thereto in suitable positions by inserting fastening means through the perforations into the lower ends of the stays.

The invention will now be described in greater detail with reference to the accompanying drawings wherein:

Fig. 9 is a plan view of the apparatus shown in detail for making the mold inserts;

Fig. 10 is a side elevation of the apparatus;

Fig. 11 is a fragmentary vertical section taken on the line 11—11 of Fig. 9;

Fig. 12 is a detail of a part of the molding apparatus;

Fig. 13 is a plan view of an alternative form of apparatus;

Fig. 14 is a vertical elevation of the apparatus shown in Fig. 13 partly in section, taken on the line 14—14 of Fig. 13;

Fig. 15 is a perspective view of molding apparatus for making a cuban heel;

Fig. 16 is a perspective view of the mold insert with a cuban heel attached to the lower end thereof;

Fig. 17 is a top plan view of a mold box prior to casting of the mold;

Fig. 18 is a perspective view of the mold box with the insert and cuban heel set into it broken away in part, prior to casting the mold;

Fig. 19 is a horizontal cross-section of the mold box after the mold is cast in place and with the insert and cuban heel removed; and Fig. 20 is a top plan view of the completed mold.

Figure 1:
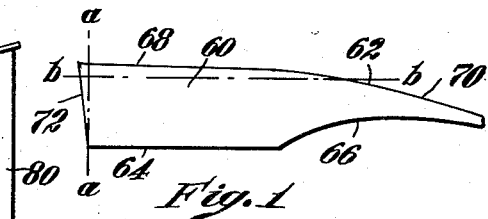
Fig. 1 is a side elevation of one kind of article, namely a so called "Wedgie" heel for which the mold is to be made.
Figure 4:
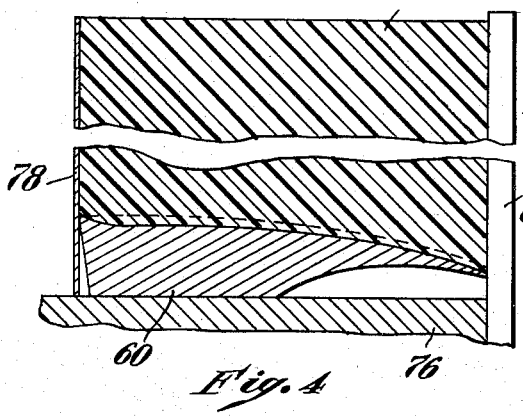
Fig. 4 is a vertical section longitudinally of the apparatus showing the plastic poured to form the insert for the upper side of the heel.

The method for making the mold and inserts illustrated herein is applicable to making articles of various size and shape and is herein illustrated specifically with respect to the manufacture of a mold and inserts for making wedge heels such as shown in Fig. 1. The wedged heel, a wood pattern of which is illustrated, has a body portion 60 and a tapering shank portion 62 projecting forwardly therefrom. The bottom 64 of the heel is substantially flat from its rear end forwardly to the tapering shank and there inclines upwardly in an arch 66. The top 68 of the heel is nearly parallel to the bottom 64 although it slopes slightly from its rear end forwardly and merges with the tapering portion 62 in a smooth convex slope 70. Actually, the upper surface of the heel is transversely convex as shown in Fig. 4 to some extent, to form a cradle for the bottom of the heel. The perimeter or edged face of the heel 72 tapers from top to bottom along both sides and its rear end. The heel as thus described is compacted to the shape shown by pressing an uncompacted preform of fibrous material such as is illustrated in the aforementioned pending application of Richter and Gillette, and this invention is related primarily to the method of making mold for pressing the preform to shape.

Figure 3:
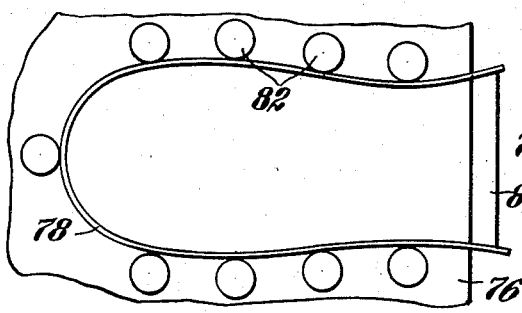
Fig. 3 is a fragmentary plan view of apparatus used in making the mold inserts shown diagrammatically.
Figure 5:
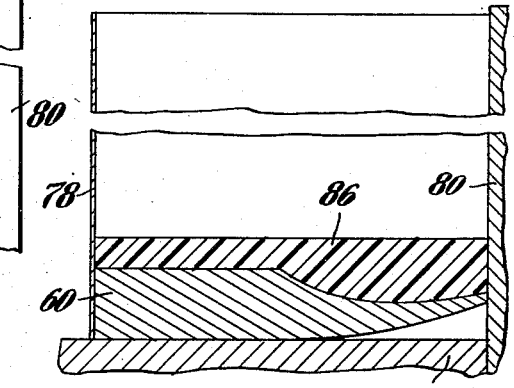
Fig. 5 is a corresponding section showing the plastic poured to form the insert for the lower side of the heel.

Figs. 3, 4 and 5 illustrate diagrammatically the method which consists of placing a wood heel hereinafter referred to as a pattern 60 (Fig. 4) right side up on a rigid support 76 and fastening it thereto by suitable means. A wall 78 is then erected on the support 76 about the perimeter of the heel, that is about its two sides and its rear end, the wall consisting of a thin flexible sheet of metal bent about the perimeter of the heel so as to stand substantially perpendicular to the support 76 and so as to have a cross-section corresponding to a perpendicular projection of the upper surface of the heel. The forward end of the wall is closed by a plate 80 fastened to an end of the support 76. A plurality of holding means diagrammatically shown at 82 are arranged about the wall and are adjusted so as to have engagement therewith and hold it in close conformation to the pattern. A closed walled receptacle is thus formed in which the bottom is constituted by the upper surface of the heel and into this walled receptacle there is poured a fluid plastic which is allowed to harden to form a rigid block 84 whereupon the wall 78 and plate 80 are removed and the solidified block of plastic is separated from the top of the heel. A parting composition is applied to the inside of the wall and to the top surface of the heel prior to pouring the plastic so that the plastic will not stick to the wall and heel. The block thus formed will have a cross-section corresponding to a perpendicular section of the upper or top surface of the heel and its end or acting face will correspond in contour to the upper surface of the heel. This block 84 of plastic forms one of the inserts of the molding apparatus and will be referred to hereafter as insert 84.

Figure 2:
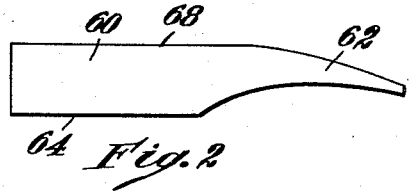
Fig. 2 shows the heel altered for a purpose which will appear hereinafter.

The heel 60 is now trimmed to remove the taper from top to bottom as shown in Fig. 2. The part removed being defined by the line a–a (Fig. 1). Material is also removed from the top of the heel, as defined by the line b–b, so that its upper surface is a plane surface and is substantially parallel to the lower surface 64. The modified heel pattern shown in Fig. 2, is inverted and placed with the top 68 on the support 76 as illustrated in Fig. 5, and is then fastened to the support. Following the procedure described above, a wall 78 is now erected on the support 76 about the periphery of the altered pattern and perpendicular to the support so as to form a receptacle having a cross-section corresponding to the perpendicular projection of the lower surface of the heel at two sides and the rear end thereof. The open front of the wall is closed as described before by plate 80, so that a closed receptacle is formed, the bottom of which is constituted by the bottom of the pattern. A fluid plastic is now poured into the receptacle on top of the pattern to form when it is hardened a block 86 which has a cross-section corresponding to a perpendicular projection of the bottom of the heel and a surface contour corresponding to the bottom side of the heel. The block 86 forms a second insert for the molding apparatus.

Figure 7:
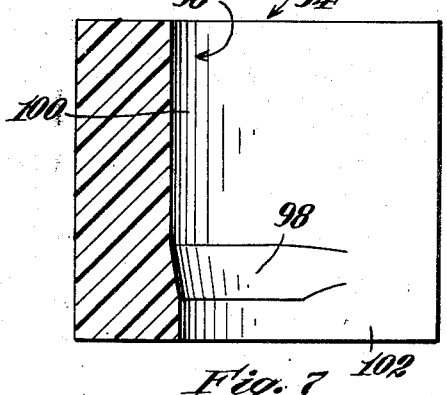
Fig. 7 is a vertical section of the mold block with the inserts and heel removed illustrating the finished mold cavity.
Figure 8:
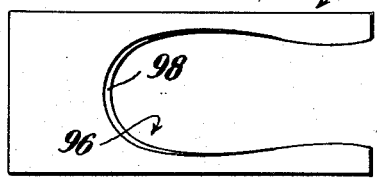
Fig. 8 is a plan view of the mold block.
Figure 6:
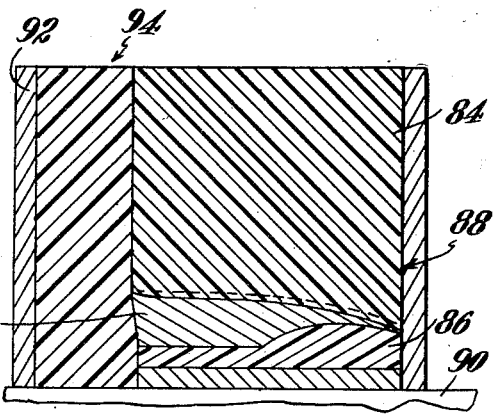
Fig. 6 is a vertical section of the inserts with a heel sandwiched therebetween and with a plastic material cast about them to form a mold block.

The two inserts 84 and 86 are now assembled with an unmodified wood heel pattern such as shown in Fig. 1 therebetween as illustrated in Fig. 6, so as to form a composite core 88. The core 88 is placed on a support 90, a core box 92 is placed about the core and then a fluid plastic is cast about the composite core so as to provide a mold block 94 of hardened plastic having an internal cavity 96 open at one end as shown in Figs. 7 and 8. As thus formed, the cavity has an intermediate portion 98, the peripheral contour of which corresponds exactly to the peripheral edge surface of the heel pattern and the depth of which corresponds to the thickness of the heel pattern. Above the intermediate section 98 is a section 100 which is of uniform cross-section throughout and which corresponds in cross-section to the perpendicular projection of the upper surface of the heel. Below the intermediate section is a section 102 which is also of uniform cross-section throughout and which corresponds to a perpendicular projection of the bottom side of the heel. As thus constructed, the inserts 84 and 86 may be slidably introduced to the mold block 94 and each will penetrate the block to the intermediate section. The lower insert 86 is stationary during the molding operation and in effect constitutes the bottom of the mold. Movement of this insert is only necessary to eject the formed article. The depth of the section 100 above the intermediate section is designed to receive the whole thickness of the preform prior to pressing and the upper insert 84 is made thick enough so that it will be self guiding as it enters the cavity and is pressed downwardly to compact the preform.

While the mold block as herein illustrated is open at the front, for the reason that it is easier to manufacture and that it is easier to remove the compacted article, it is entirely within the scope of the invention and has in fact been practiced to make the mold block with a closed front, that is so that the cavity is closed all the way around except for the top and bottom.

The mold and mold inserts have also been described as being made of a plastic and this has proved to be highly satisfactory because of the ease which the mold parts may be made and because the parts are light in weight. It is to be understood, however, that any castable material may be used and metal has been used to make such molds. Metal molds, however, are extremely heavy and hence for this reason awkward to handle.

The apparatus for making the inserts preparatory to making the mold block is illustrated in Figs. 9 to 14 inclusive. The appaartus is shown in alternative forms although the essential features are common to both forms. Referring specifically to Figs. 9 to 12 inclusive, the apparatus is shown as consisting of a rigid base 10 having a plurality of longitudinally arranged transversely spaced grooves 12 and 13. The groove 13 is formed along the center of the block and in a raised or elevated portion 14 thereof. Mounted on the base are a plurality of rails 15, the upper or top sides of which have undercut grooves 16 therein. The rails have fastened to their undersides dove-tailed blocks 17 for engagement with the grooves 12 in such manner that the rails may be slid along the upper surface of the base. As illustrated, there are two rails, a pair on each side of the elevated or raised portion 14 of the base and they extend transversely of the grooves 12. Each of the rails 15 has mounted on it a stay 20 (Fig. 10) which is roughly trapezoidal in shape and has made fast to its base dove-tailed blocks 25, 26 and 27 (Fig. 11) which fit into the undercut groove 16. The blocks 25 and 27 are made fast to the lower end of the stay by means of screws 35 and 37. The block 26 is loosely carried by the lower end of a screw 36 threaded into the lower end of the stay in an opening 36' provided for this purpose. It is evident by the foregoing construction that the stay 20 may be moved longitudinally of the rail 17, transversely of the base to any given position and may be made fast at a selected position by rotation of the screw 36 so as to cause binding between the block 26 and the undercut portions of the groove 16. The stays 20 have at their upper ends overhangs 20a, each of which has a vertical hole 20b therein. The blocks 25 fastened to the lower ends of the stays project forwardly therefrom beneath the overhangs 20a and have in them holes 21a which are in vertical registry with the holes 20b. A post 21 is mounted on each stay between the overhang and the block 25 and has at its ends stub shafts 20c and 21c arranged eccentrically of the longitudinal axis of the post. The upper end of the stub shaft 21c extends through the overhang and has a squared head 21d, on which a tool such as a wrench may be placed for turning the post with reference to the stay 20. A similar stay 20 is mounted for sliding movement along the groove 13, longitudinally of the base. This stay has blocks 25, 26 and 27 fast to its lower end which in contrast to the other stays are engaged within the groove 13 of the base directly rather than through the intermediary of the rails 15. This stay like the previously described stay has a locking screw 36 and an eccentric post 21.

At one end of the base, that is the right end as illustrated in Fig. 9, there is arranged a set of clamping members 40 consisting of strips of metal 41, 42, 43, 44 and 45. The strip 43 is in the form of a rigid plate and is fastened to the base so as to stand perpendicular to its upper surface substantially at the end of the elevated portion 14 by means of a screw or bolt 50 threaded through its lower end into the end of the base. The plate 43 has projecting laterally therefrom at opposite vertical edges, spaced parallel pins or shafts 46 located near the top and bottom of the plate, which are adapted to be received by holes extending through the clamping members 42 and 44. In addition to these locating pins there are clamping bolts 47, which extend loosely through the strips 41, 42, 44 and 45 and are threaded into openings in the plate 43.

In conjunction with the base there is employed a sheet of flexible material, for example sheet metal 49 which may be placed on edge on the base and bent to conform to the pattern 60 of the heel, the latter being made fast to the base, for example by screws. The sheet is selected so as to be long enough to extend around three sides of the pattern leaving the front side thereof open. The width of the sheet will depend entirely upon the thickness of the insert which is to be made.

In use a pattern of the article to be made, for example as illustrated, a "Wedgie" 60 (Figs. 1 and 10) is fastened to the upper surface of the base right side up with its front against the plate 43. The metal sheet 49 is now placed on edge about the perimeter of two sides and the rear end of the heel with its opposite ends extending beyond the breast of the heel at opposite sides of the plate 43. The stays 20 at opposite sides of the pattern and at the rear end of the pattern are now moved inwardly toward the pattern so as to bring the posts 21 close to the metal sheet 49 whereupon they are clamped in position to engage the metal sheet 49 and to cause it to conform to the shape of the pattern. Suitable pressure may be applied to the metal sheet as the various points of contact of the posts therewith so as to make the conformation accurate by applying a wrench to the upper ends of the shafts and turning the posts on their eccentrics to apply more or less pressure. The free ends of the sheet 49 are now clamped to the plate 43 by placing the metal strips 42 on the pins 46 and then bolting the strips 41 and 45 against the outsides of the metal sheet. As thus arranged, an open top walled receptacle is provided which conforms in cross-section to the perpendicular projection of the upper surface of the heel, the latter forming the bottom of the receptacle. A suitable fluid plastic which is hardenable may now be poured into the receptacle to the required depth and when it is solidified it will have a cross-section corresponding to a perpendicular projection of the upper surface of the heel and an acting face which corresponds in contour to the upper surface of the heel. By unclamping the metal strips 41 and 45, and retracting the stays 20, the metal plate may be peeled away from the solidified plastic and the plastic block removed. The base is provided with vertically adjustable feet 11, so that the base may be leveled.

As formerly described with reference to the practice of the method, the heel is now trimmed as illustrated in Fig. 2, to remove its taper and flattened on its upper surface so that it is substantially parallel to its lower surface whereupon the altered heel is inverted, fastened to the base 10 and the metal plate 49 erected about it and caused to conform to it in the same manner as just described. After the wall has been properly erected to provide a suitable receptacle, plastic again is poured into it to provide the second insert for the mold which in this case will have a cross-section corresponding to a perpendicular projection of the bottom side of the heel and an acting face corresponding to the surface of the bottom of the heel.

The two inserts prepared as described with this apparatus are then combined with an unaltered pattern and the mold block is then prepared as described above. The kind of mold box used to take the casting is immaterial and hence will not be described.

The alternative apparatus for making the mold parts as illustrated in Figs. 13 and 14 is of somewhat simpler construction. As therein illustrated, the base 104 has a plurality of perforations 106 distributed longitudinally and transversely of its surface at closely spaced intervals. Stays 107 in the form of substantially rectangular posts are mounted on the base perpendicular thereto and secured in position by fastening elements, for example, screws 108 inserted through the perforations 106 and threaded into the lower ends of the post. By reason of the large number of perforations 106, it is evident that the posts may be placed at substantially any selected position on the base and in practice are arranged so as to roughly outline the shape of the pattern 60, fastened to the base. Each post 107 has threaded through it at upper and lower ends, a pair of screws 108 on the inner ends of which are mounted slats 110 having curved faces 112 for engagement with the metal wall 49 which surrounds the pattern 60. By turning the screws 108 in the posts the slats may be caused to press the metal plate into close conformity wtih the pattern. By suitable adjustment of the upper screw the metal wall 49 may be brought into exact perpendicularity if there is any tendency for it to bulge outward. It has sometimes been found advisable to use a supplementarmy wooden wedgie pattern inserted into the space defined by the top of the metal wall 49, thus preventing the metal wall from buckling inwardly. It has sometimes been found advantageous when casting insert 84, Fig. 4, to have the supplementary wooden pattern a hair larger than the preliminary pattern around which the metal wall 49 is wrapped, thus to provide a very slight desirable draft which facilitates removal of the insert 84 from the plastic which is subsequently cast around it. The supplementary wooden pattern has a hole cut through it to permit the liquid plastic to be poured into the cavity. At the open end of the wall a block 114 is fastened to the base so that it fits against the breast of the heel pattern. The ends of the wall overlap the opposite sides of the block and are held in close contact therewith by two of the stays, one at each side, which are located in a position to press the ends of the metal wall against the block. As thus constructed, the inserts may be made by pouring a liquid plastic into the receptacle in the same way as described above, first to make an insert for one surface of the heel and then for the other.

A modification of the method and apparatus described above but which is embraced within the scope of the present invention may be used for the manufacture of cuban type heels. The method and apparatus for this are illustrated in Figs. 15 through 20 inclusive. Briefly, a pattern 116 of a cuban heel is fastened to a rigid base 118 having a plurality of perforations 120 therein as illustrated and described in detail with reference to Figs. 13 and 14 whereupon a metal plate 122 is erected above the heel pattern as illustrated in Fig. 15, perpendicular to the base and in contact with the perimeter of the heel at its upper end so as to enclose the back and sides of the heel. A strip 124 having a curved surface 126 corresponding to the breast line of the heel is also fastened to the base so as to have contact with the breast of the heel pattern. The ends of the metal plate are bent about the heel and extend along opposite sides of the strip in contact therewith. Stays such as were described in connection with Fig. 13 and hence not illustrated again, are now mounted on the base and adjusted to hold the plate in close conformity to the heel pattern. The open top receptacle thus formed, is now filled or partially filled with a fluid plastic which upon hardening forms a block or insert 128 (Fig. 16) having a cross-section corresponding to a perpendicular projection of the top of the heel and an end face corresponding to the contour of the upper surface of the heel. The metal plate is now removed and the heel pattern is screwed directly to the lower end of the block as shown in Fig. 16.

A two-part mold box 130 as illustrated in Fig. 17, and which corresponds to the mold box shown in a patent to Richter No. 2,198,634 of April 30, 1940, is provided and placed upon a suitable base in an upright position on a base 132. The mold box is substantially rectangular in cross-section and consists of two halves 134 and 136 hinged together, so that the halves may be opened or brought together to form a rectangular enclosure. In contrast to the mold box shown in the patent referred to, the rear or hinged walls of the halves are inwardly convex as at 138, so as to conform to the breast line of the molded insert just described and to the breast of the heel attached to the lower end of the insert. Screws 140 are threaded through walls of the two halves at opposite sides as shown in Fig. 19, the insert 128 with heel pattern 116 attached, are placed within the mold box as illustrated in Fig. 18 so as to bear against the curved wall 138. A thin sheet metal plate 142 now placed within the box with an edge 144 of it screwed to one of the halves at their meeting point and its other edge 146 cut to conform to the rear line of the insert and the heel (Fig. 18). The closed mold box is then partitional into two sections. A fluid plastic is poured into the mold box about the heel and allowed to solidify, whereupon because of the hinged connection between the halves and the partition sheet 142, it may be opened to permit removal of the insert plate. The plastic portions 148 will be firmly held to the halves of the box by the screws 140, as illustrated in Fig. 19. With the foregoing mold and insert a Cuban heel may readily be made by compressing a fluid pulp suspension as practiced in the patent to Richter No. 2,236,354.

While the apparatus and method described herein is specifically illustrated as applied to the manufacture of heels, it is evident that it is equally applicable to the manufacture of other irregularly shaped articles.

I claim:

1. A method of making a mold block for use in the manufacture of a heel comprising making blocks which conform in horizontal section to a perpendicular projection of each side of the heel, one having an end face corresponding in surface contour to one side of the heel and the other to the opposite side of the heel, sandwiching a wood heel pattern between the blocks, casting a fluid material about the composite core formed by the blocks and heel pattern, allowing the plastic to solidify and then removing the blocks and heel.

2. A method of making a mold block and inserts for use in the manufacture of an article which tapers from one face to the other comprising making a block-like insert corresponding in cross-section to a perpendicular projection of one face of the article and with an end face corresponding in contour to said face, making a second block-like insert corresponding in cross-section to a perpendicular projection of the other face of the article and with an end face corresponding to the contour of said face, sandwiching a pattern of the article between the end faces of the blocks, casting a hardenable material about the composite core, allowing the material to solidify and then removing the inserts and article.

3. A method of making a mold and inserts therefor for use in the manufacture of an article which tapers from one face to the other, comprising fixing a pattern of the article in a predetermined position, erecting a wall at each face of the article in turn corresponding in shape to a perpendicular projection of the face so as to form a walled chamber having at its bottom one face of the article, pouring a liquid plastic into the chamber and permitting it to solidify so as to take the shape of the wall and the surface of the face, assembling the solidified blocks of plastic with the pattern of the article therebetween, casting a liquid plastic about the composite of the blocks and the article which when solidified will have an internal cavity corresponding in shape to the external surface of the composite of blocks and article and then removing the blocks and article.

4. A method of making a mold for use in the manufacture of a heel which tapers from top to bottom comprising supporting a rigid pattern of a heel of the desired shape with its bottom down, erecting a wall about the perimeter of the heel pattern, perpendicular to the bottom so as to provide an open top walled receptacle the bottom of which is constituted by the top of the heel, introducing a quantity of flowable plastic material into the receptacle so that it will take the shape of the receptacle and will conform to the top of the heel, allowing the plastic to set, removing the resultan block and heel pattern, removing the taper from the heel pattern and sufficient material from the top of the heel so that its top is parallel with the bottom of the heel, inverting the heel so that it now rests on its top, erecting a wall about the perimeter of the modified heel pattern perpendicular to the top and bottom surfaces, so as to provide an open top walled receptacle, the bottom of which is constituted by the bottom of the heel pattern, introducing a quantity of fluid plastic material into the receptacle so that it will take the shape of the receptacle and will conform to the bottom of the heel pattern, allowing the plastic to set, removing the resultant block and heel pattern, sandwiching an unmodified heel pattern between the two blocks, casting a flowable plastic about the sides of the blocks and heel pattern, leaving the bottom and top open, allowing the plastic to harden and then removing the blocks and heel pattern.

5. A method of making a mold block, having a longitudinal chamber open at opposite ends, for use in the manufacture of a heel, comprising making two blocks, one of said blocks conforming substantially in horizontal section to a perpendicular projection of one side of the heel and having an end face corresponding in surface contour to said one side of said heel, and the other of said blocks conforming substantially in horizontal section to a perpendicular projection of the oppostie side of said heel and having an end face corresponding in surface contour to said opposite side of said heel, said blocks being adapted to be inserted in the open ends of said chamber with said end faces thereof facing each other so as to be slidably movable within and along the inside walls of said chamber toward each other with said end faces thereof facing toward each other, sandwiching a pattern of said heel between said end faces of said blocks with said end faces abutting against the sides of said pattern, casting a fluid material about the perimeter of the composite core formed by the sandwiched blocks and heel pattern, said perimeter being taken about the longitudinal axis of said core running through said blocks and said pattern, allowing the fluid material to solidify and then removing said blocks and heel pattern, whereby said mold block is formed having a chamber therein open at opposite ends and corresponding in shape to said perimeter of said core and in length substantially to the sum of the height of said blocks and the height of said pattern, said blocks being removable from said solidified mold block by moving them away from each other out of the open ends of said solidified mold block.

6. A method of making a mold block, having an inside chamber open at opposite ends, and two block-like inserts for forming within said chamber an article which tapers from one face to the other, said method comprising making one of said block-like inserts having an end face corresponding in contour to one face of said article, making the second block-like insert having an end face corresponding to the contour of the opposite face of said article, said inserts being of such shape as to be adapted to be inserted in the open ends of said chamber so as to be slideably movable within and along the inside walls thereof toward each other with said end faces of said inserts facing each other, sandwiching a pattern of the article between the said end faces of the inserts to form a composite core, casting a hardenable material about the perimeter of said composite core, said perimeter being taken about the longitudinal axis of said core passing through said inserts and said pattern, allowing said material to solidify and then removing the inserts and pattern to form a mold block with a chamber therein corresponding in shape to said perimeter of said core and in length substantially to the combined height of said blocks and said pattern.

References Cited in the file of this patent

UNITED STATES PATENTS

| | | | |
|---|---|---|---|
| 287,617 | Brainerd | Oct. 30, | 1883 |
| 384,448 | Keller | June 12, | 1888 |
| 486,607 | Willey | Nov. 22, | 1892 |
| 996,783 | Moreau | July 4, | 1911 |
| 1,401,577 | Becker | Dec. 27, | 1921 |
| 1,556,802 | Page | Oct. 13, | 1925 |
| 1,661,425 | Hess | Mar. 6, | 1928 |
| 1,692,433 | Barkschat | Nov. 20, | 1928 |
| 1,824,835 | Pierce | Sept. 29, | 1931 |
| 2,082,451 | Kivlahan | June 1, | 1937 |
| 2,138,974 | MacDonald | Dec. 6, | 1938 |
| 2,198,634 | Richter | Apr. 30, | 1940 |
| 2,306,516 | Zahn | Dec. 29, | 1942 |
| 2,397,168 | Touceda | Mar. 26, | 1946 |
| 2,482,257 | Frei, Jr. | Sept. 20, | 1949 |